Aug. 10, 1965    SHIH-YING LEE ETAL    3,199,345
TEMPERATURE COMPENSATED TRANSDUCER
Filed Dec. 26, 1962    3 Sheets-Sheet 1

INVENTORS
SHIH-YING LEE
YAO TZU LI
BY
Kenway, Jenney + Hildreth
ATTORNEYS

INVENTORS
SHIH-YING LEE
YAO TZU LI
BY
ATTORNEYS

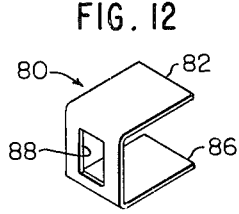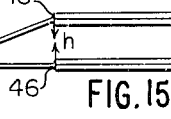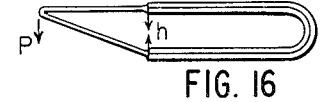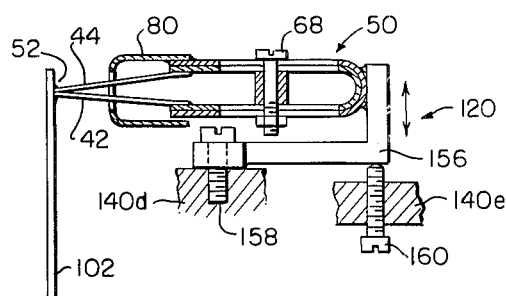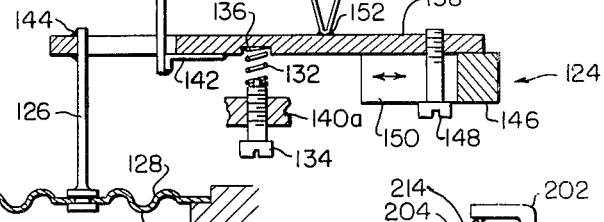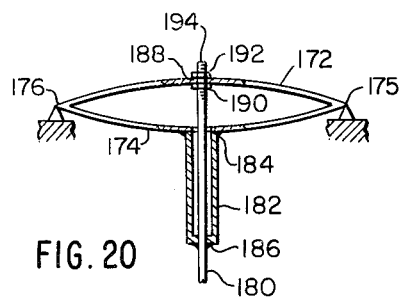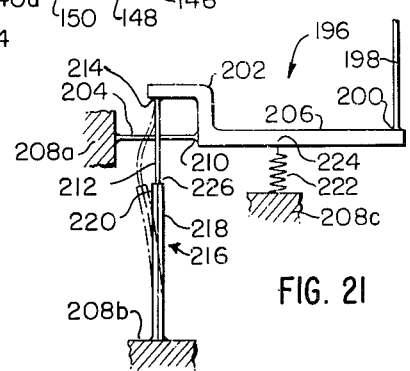

United States Patent Office 3,199,345
Patented Aug. 10, 1965

3,199,345
TEMPERATURE COMPENSATED TRANSDUCER
Shih-Ying Lee and Yao Tzu Li, both of
Huckleberry Hill, Lincoln, Mass.
Filed Dec. 26, 1962, Ser. No. 247,191
12 Claims. (Cl. 73—141)

The present invention relates to force sensing transducers and more particularly to force sensing transducers having sensitivity characteristics which vary with temperature.

An example of a force sensing transducer which has characteristics which vary wtih temperature is the solid state electrical strain gage transducer. In such transducers the strain gages are conventionally connected in a Wheatstone bridge so that the ratio of bridge output voltage to bridge excitation voltage will vary as a function of the strain or deflection of the strain gage. The input force to the transducer may be supplied by means appropriate to the medium being measured. For example, if fluid pressure is under study a pressure responsive bellows provides an appropriate force input means. The input force is suitably coupled to the deflectable strain gages so that the changes in the input force will result in changes in the deflection of the gages. This change in the deflection of the gages will produce changes in the resistance of the individual strain gages and thus a change in the ratio of bridge output voltage to bridge excitation voltage. Therefore, the strain gage bridge voltage ratio will be a measure of the fluid pressure supplied to the pressure responsive bellows.

Unfortunately, measurements must often be made under conditions wherein the ambient temperature environment cannot be maintained at a constant reference level. These changes in the temperature of measurement result in changes in the bridge voltage ratio achieved for a given force input. One factor producing this change is the fact that the relationship of bridge voltage ratio to strain is normally effected by temperature because the strain gage material is temperature sensitive.

The term "temperature sensitive," as applied to strain gage material, is used here to define strain gage material, the resistance and gage factor of which vary with temperature. The gage factor of a strain gage is defined as the ratio of percent change of resistance and percent change of strain. Thus, with temperature sensitive strain gage materials, the strain gage bride voltage ratio will vary with the temperature of the strain gage material as well as with the strain thereof; and more importantly, the rate of change of the bridge voltage ratio as a function of strain, or in other words, the sensitivity of the bridge will vary with temperature. The sensitivity of the bridge is defined as the rate of change of bridge voltage ratio as a function of strain.

Certain semi-conductive materials, namely, silicon and germanium, have been found to have the characteristic of piezo resistivity, so that they may be used as strain gage materials. However, these semi-conductor or solid state materials are particularly temperature sensitive. For example, their use in a strain gage bridge may result in a bridge sensitivity change of as much as 25% for each 100° F. change in temperature. Also, when these semiconductor materials are used as strain gage material, the change in bridge sensitivity is inversely related to the change in temperature.

Until the invention of the temperature compensated transducer set forth in our co-pending application Serial No. 77,364, transducers could be temperature compensated with respect to the zero adjustment only. Our copending application Serial No. 77,364 sets forth apparatus and methods whereby temperature compensation for sensitivity, as well as for zero adjustment, may be achieved.

However, for some applications it is desirable to have apparatus which may be more easily fabricated and does not require delicate flexures. Furthermore, certain space age strain gage requirements impose miniaturization requirements which have been impossible to meet heretofore.

Accordingly, it is an object of this invention to provide improved compensation means for eliminating temperature induced changes in sensitivity for force sensing transducers.

It is another object of this invention to provide improved means for eliminating temperature induced changes in the output corresponding to zero force input for force sensing transducers.

It is another object of the present invention to provide effective adjusting means for varying the compensation introduced to eliminate temperature induced changes in the characteristics of force sensing transducers.

It is a still further object of the present invention to provide means whereby the characteristic curve of the compensation introduced to eliminate temperature induced changes in sensitivity is modified to match the characteristic curve of the force sensing transducer.

Still another object of this invention is the provision of a fully temperature-compensated force-sensing transducer which may be easily fabricated.

Yet another object of this invention is the provision of a fully-compensated force sensing transducer adapted to miniature construction.

A further object of this invention is to provide a temperature-compensated force-sensing transducer with improved dynamic response.

These and other objects of the present invention are achieved with force sensing transducers which incorporate elements whose characteristics vary in a predetermined relationship with temperature. The net transducer output is a function of the characteristics produced by the interaction of these constituent elements. Sensitivity correction is provided by a geometric configuration including at least one elastic element. The invention likewise includes the various features set forth in the following specification and drawings wherein:

FIG. 1 contains curves showing transducer sensitivity as a function of temperature, compensator stiffness as a function of temperature, and sensitivity as a function of temperature;

FIG. 12 is a perspective view of the curvature modifying element of the structure of FIG. 11;

FIG. 14 is an elevation view of a stiffness compensator of the type shown in FIG. 6 arranged to produce no change in "zero" with changes in temperature;

FIG. 15 is a cross-section view of a stiffness compensator of the type shown in FIG. 6 distorted to produce a change in "zero" with changes in temperature;

FIG. 16 is an elevation view of a stiffness compensator of the type shown in FIG. 6 distorted to produce a change in "zero" with changes in temperature;

FIG. 17 is a perspective view of a cantilever beam with semi-conductor strain gages;

FIG. 18 is an elevation view, partially in cross-section, of a complete force sensing transducer assembly;

FIG. 20 is an elevation view, partially in cross-section, of a stiffness compensation mechanism in the form of a truss; and FIG. 21 is an elevation view, partially in cross-section, of a stiffness compensator incorporating an elastically restrained beam.

Figure 1A:
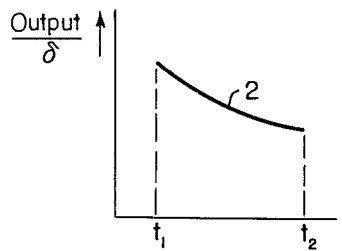

Referring now to FIG. 1a, the output characteristic of a solid state strain gage is shown. The change in characteristic with temperature has been exaggerated for the sake of clarity in the drawing. The ratio of output to a given deflection δ is plotted as the ordinate. Corresponding temperatures are plotted on the abscissa, with increasing temperatures to the right. It will be seen that as the temperature rises the output for a given deflection decreases. Thus, there is not only a change in the output for a given input deflection, but also a reduction in the output signal at elevated temperatures. These temperatures may be encountered, for example, in certain missile applications. Typical circuit means whereby such strain gages are interconnected to provide an output signal are set forth in our above-mentioned application Serial No. 77,364, to which application reference is made.

Figure 1B:
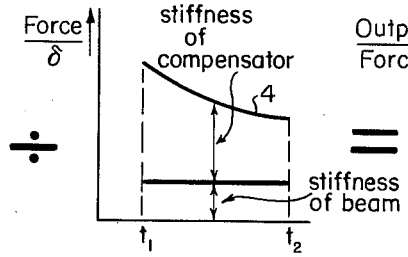

Referring now to FIG. 1b, an assumed stiffness curve, that is, force corresponding to a given deflection δ, is shown as a function of temperature for an assumed temperature compensator. This curve has been chosen to correspond in shape with the curve of FIG. 1a. The stiffness compensator can be used to produce an overall output to input force characteristic in accordance with the following equation:

$$\frac{output}{force} = \frac{output}{\delta} \div \frac{force}{\delta} \quad (1)$$

Figure 1C:
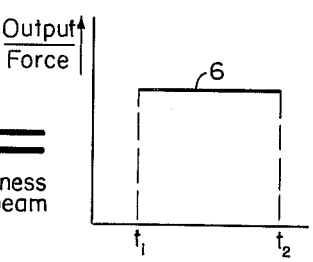

A desired characteristic curve showing a constant force sensitivity with changes in temperature is shown in FIG. 1c. While the details of the division are not shown, the curve of FIG. 1c is obtained in accordance with Equation 1 by, for each temperature, dividing the value of the curve of FIG. 1a by the curve of FIG. 1b. It will be apparent that as the value of the curve in FIG. 1a decreases with temperature the value of the stiffness characteristic in the curve of FIG. 1b suffers a similar decrease so that their quotient remains constant.

Figure 2:
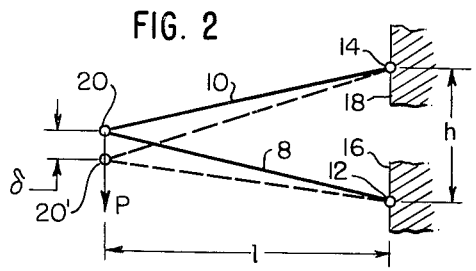
FIG. 2 is a view in elevation of a stiffness compensator employing hinged elements.
Figure 3:
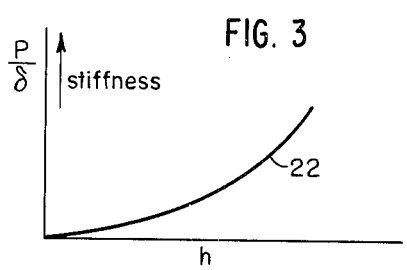
FIG. 3 is a curve showing the stiffness of the compensator of FIG. 2 as a function of the separation of element hinge points.

Referring now to FIG. 2, a suitable geometric configuration utilizing elongated elements or members for the stiffness compensator is shown. A three-hinge, two-bar structure is employed. Bars 8 and 10 are hinged at points 12 and 14, respectively, on surfaces 16 and 18, respectively. The other ends of bars 8 and 10 are joined together at hinge 20. While one of the bars may be completely rigid, at least one of the elongated members must be elastic in its response to applied forces. The stiffness characteristics of such a structure is shown in FIG. 3. The curve 22 shows the increase in stiffness of the two-bar, three-hinge structure as the distance h by which hinges 12 and 14 are separated is increased. The stiffness is proportional to the force P required to produce a given deflection δ. Thus, it will be seen that with increasing separations of the hinges 12 and 14, the force required to produce a given deflection increases.

Figure 4:
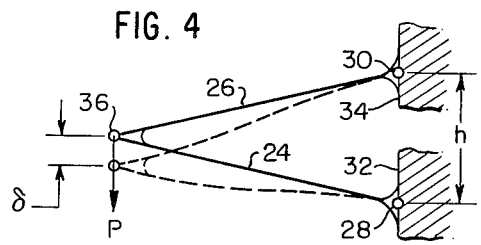
FIG. 4 is an elevation view of a stiffness compensator employing rigid joints.

While the structure of FIG. 2 produces a useful characteristic, we have found that construction techniques are simplified if the hinges 12 and 14 are replaced with fixed connections. Such a structure is illustrated in FIG. 4. In the structure of FIG. 4 bars 24 and 26 are rigidly fixed at points 28 and 30 to surfaces 32 and 34. The other ends of bars 24 and 26 may be hinged or may be solidly joined at point 36 as shown in FIG. 4.

The difference in the performance characteristics obtained when rigid connections are substituted for hinge points is illustrated by the dotted lines showing the deflected positions in FIGS. 2 and 4. Referring now to the dotted deflection position of FIG. 2, it will be seen that the bars retain their straight configuration. With the structure of FIG. 4, however, there is a bending action at the terminal portions connected to the surfaces 32 and 34. Elastic elements have been used for bars 24 and 26. There is a similar although lesser bending characteristic at the other terminal portions joined at point 36. As shown by the dotted lines representing a deflected position, this bending action introduces a slight deviation from the straight line structure so that the bars 24 and 26 assume a slightly curved form.

Figure 5:
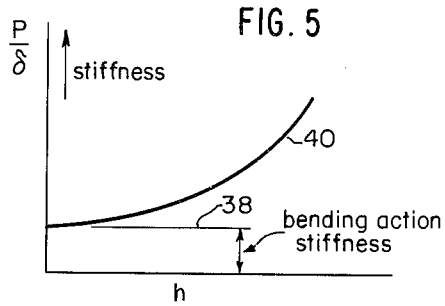
FIG. 5 is a curve showing the stiffness of a compensator according to the structure of FIG. 4 as a function of the separation of the two rigid joints.

We have found that the changed structure of FIG. 4 produces a slightly different stiffness characteristic as shown in FIG. 5. The primary feature of this changed characteristic is the upward displacement of the entire curve from the horizontal axis. In the structure of FIG. 2 zero separation h produces a structure with zero stiffness. That is, when the two hinge points come together, this structure may be freely pushed up or down. In the structure of FIG. 4, however, when the hinge points come together, there is still a certain stiffness resulting from the bending action of the bars 24 and 26. This force introduced by bending action stiffness at zero separation h produces a modification in the stiffness characteristic represented by the straight line curve 38 in FIG. 5. The curve 40 in FIG. 5 represents the composite stiffness characteristic produced by the bending action stiffness plus the stiffness due to the separation h of the points 28 and 30.

Figure 6:
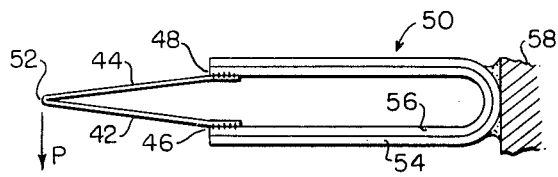
FIG. 6 is an elevation view, partly in cross-section, of a stiffness compensator assembly incorporating temperature correction.

Referring now to FIG. 6, a preferred stiffness compensator is shown. The stiffness compensator incorporates two arms 42 and 44 connected at their ends 46 and 48, respectively, to a bi-metal strip 50. The other end of the arms 42 and 44 are joined together at point 52. The bi-metal strip 50 is composed of an outer layer of material 54 and an inner layer 56. The closed end of the bi-metal U 50 is solidly affixed to a support member 58.

Figure 7:
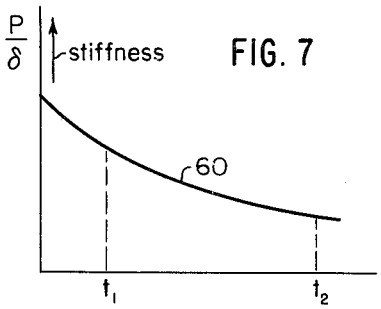
FIG. 7 is a curve showing the stiffness of the structure of FIG. 6 as a function of temperature.

As the temperature rises the outer layer 54 of the bi-metal U 50 expands more than the inner layer 56. These characteristics of the sections 54 and 56 cause the points 46 and 48 to come closer together as the temperature increases. That is, the separation of the points 46 and 48 varies inversely with temperature. The analysis set forth in the above discussion with respect to the structures of FIGS. 2 and 4 has shown us that the structure of FIG. 6 has a stiffness characteristic as shown in FIG. 7. That is, as shown by the curve 60 in FIG. 7, the stiffness or force required to produce a given deflection decreases as the temperature increases. We have found the structure of FIG. 6 to be a preferred way to achieve the stiffness compensation characteristic shown in FIG. 1b.

Therefore, the characteristic of a typical semi-conductor strain gage as shown in FIG. 1a may be compensated by a structure according to FIG. 6 to produce an output which is substantially independent of the operating temperature. It is stressed that the characteristic of the force sensing transducer under consideration is the sensitivity. That is, the compensated transducer will produce the same output signal for a given force input regardless of the temperature at which the measurement is being made.

The output characteristic as a function of temperature, shown as curve 2 in FIG. 1a, is typical of that obtained with semi-conductor strain gages. Any particular model of strain gage will have a nominal curve which is generally representative of the characteristics of that particular model of strain gage. Therefore, the dimensions and materials of a compensating structure such as that shown in FIG. 6 can be chosen to properly match the nominal characteristics of a given model strain gage assembly. However, we have found that there may be substantial variation between individual strain gage assemblies within the same model designation. Therefore, we have found it desirable to provide a stiffness compensator whose characteristics are adjustable.

Figure 8:
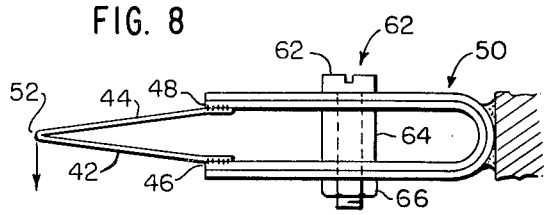
FIG. 8 is an elevation view, partly in cross-section, of a stiffness compensator incorporating variable temperature correction.
Figure 9:
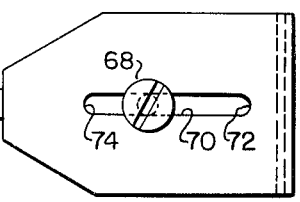
FIG. 9 is a plan view of the stiffness compensator of FIG. 8.

A preferred embodiment of such an adjustable stiffness compensator is set forth in FIG. 8. The compensator of FIG. 8 includes a bi-metal U 50 with attached arms 42 and 44 corresponding to the structure of FIG. 6. However, in addition, it has a stiffness compensation adjustment mechanism 62. This adjustment mechanism 62 comprises a spacer 64, a nut 66, and a screw 68. As shown in the plan view of FIG. 9 the screw 68 is free to move in the slots 70 within the bi-metal U 50.

Figure 10:
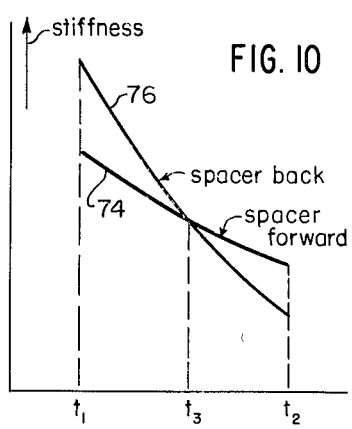
FIG. 10 is a curve showing the stiffness as a function of temperature obtainable with the structure of FIGS. 8 and 9.

The adjustment mechanism 62 operates as follows. If the screw 68 is moved back to the end 72 of the slot 70 in bi-metal U 50, the effective length of the bi-metal U is at a maximum. The stiffness characteristic curve resulting from this setting of the adjustment mechanism is shown as curve 76 in FIG. 10. If the adjusting screw 62 is moved all the way forward to the end 74 of slot 70, the resulting stiffness characteristic is shown as curve 74 on FIG. 10. When the adjustment mechanism is positioned at intermediate points curves with slopes between the extremes set by curve 74 and curve 76 will be obtained. The curves 74 and 76 cross at a temperature labelled $T_3$ in FIG. 10. $T_3$ is the temperature at which the bi-metal strip 50 has a separation equal to the length of the spacer washer 64 at that intermediate position along slot 70.

We have found that by utilizing an adjustment mechanism 62 the slope of the stiffness correction applied can be made to match the individual strain gage variation in sensitivity at two terminal temperatures. That is, when the unit is assembled its characteristic is checked at two terminal temperature points, and the spacer is positioned to make the variation in stiffness of the stiffness compensator match the variation in sensitivity of the strain gage at these terminal temperatures.

Matching variations in sensitivity at the terminal temperatures will provide nearly exact compensation for many applications. Unfortunately, some strain gages have sensitivity characteristics which do not vary with temperature according to a curve matching the stiffness compensator curvatures shown in FIGS. 1b, 7 and 10 as curves 4, 60, 74 and 76. Where this curvature variation is relatively small, a compensating structure according to FIG. 8 is satisfactory. For some strain gages, and particularly for some applications having extremely high precision requirements, still further adjustment must be provided. We have found that a stiffness compensator having sensitivity characteristic whose curvature can be modified to match transducer characteristics over extended temperature ranges can be provided.

Figure 11:
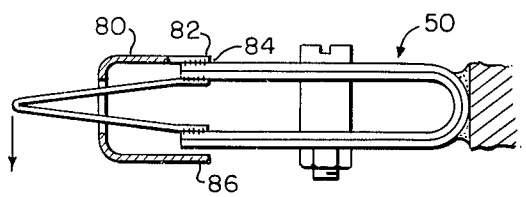
FIG. 11 is an elevation view, partially in cross-section, of a temperature-compensated stiffness corrector whose temperature characteristic curvature may be varied.
Figure 13:
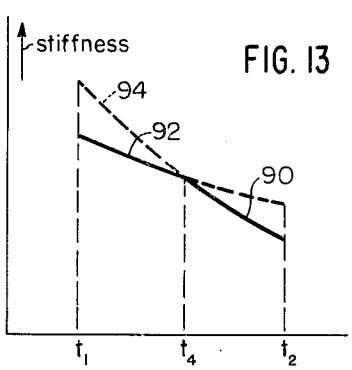
FIG. 13 is a curve showing the stiffness as a function of temperature obtainable with the structure of FIG. 11.

Referring now to FIG. 11, a stiffness compensator incorporating the features of the structure of FIG. 8 is shown. In addition, the structure of FIG. 11 incorporates an adjusting means 80 to change the curvature of the stiffness versus temperature curve. This curvature modifying member 80 is shown separately in FIG. 12. It has one end 82 attached to the bi-metal strip 50 at point 84. The other end 86 is left free. The member 80 has an opening 88 provided in the bottom of the U. When the ends of the bi-metal strip 50 are separated by an opening less than the distance between the ends 82 and 86 of the member 80, the curvature modifying member exerts no influence on the bi-metal mechanism. In this condition the curve is in the range shown by the curve 90 in FIG. 13. This section of the curve goes from temperature $T_4$ up to $T_2$.

At lower temperatures, as the bi-metal U ends continue to separate the increase in separation with decreases in temperature is restrained by the necessity of providing sufficient force to spring member 80 to a more open position. Since increased stiffness for the transducer is provided by increasing the separation of the ends of the arms 42 and 44, a decrease in the rate of separation means a decrease in the rate of stiffness increase. This characteristic is illustrated by the curve 92 on FIG. 13. The dotted section 94 illustrates the curve which would have been followed had member 80 exerted no influence. The temperature $T_4$ is the temperature at which the ends of the bi-metal U 50 are separated by a distance just equal to the opening in the U of member 80.

By means of the curvature shifting member 80 the stiffness characteristic can be made to correspond with the characteristic of the semi-conductor strain gages almost perfectly. The variation in stiffness can be made either a more straight-line function by minimizing the curvature of the stiffness versus temperature curve or a more rapidly varying characteristic by increasing the curvature of this curve. Thus, a wide variety of semi-conductor strain gage characteristics can be accommodated.

The prior discussions have been with respect to the provision or correction of characteristics relating to sensitivity as affected by temperature changes. One must also consider the characteristics as affected by the temperature when the load is constant. This type of correction is that which has been considered by the art prior to our co-pending application Serial No. 77,364. However, these earlier corrections for the change in signal with temperature do not lend themselves to use with the present invention.

We have found that the stiffness compensating mechanism of the present invention can be utilized with additional, easily fabricated mechanical structure to provide a correction in the output signal as a function of temperature corresponding to zero input force. Referring now to FIG. 14, we have found that a change in temperature produces no change in the position of the point 52 along the axis of the force P as the separation $h$ is varied. We have found that if the structure is initially distorted as shown in FIG. 15, then their junction 52 will move along the axis indicated by the arrow P as the separation $h$ varies. With an initial starting position as shown in FIG. 15, a decreasing of the spacing $h$ will move the point 52 in the direction of the arrow P. With an initial starting position distorted as shown in FIG. 16, a decreasing of the spacing $h$ will move the point 52 in the direction opposite to arrow P.

This motion of point 52 with temperature occurs irrespective of provision of hinge joints at points 46 and 48. This use of an asymmetrical configuration for the stiffness compensator to provide zero correction for temperature induced changes in the absolute value of output is discussed more fully below in connection with the description of a preferred embodiment of the complete device.

Referring now to FIG. 17, a suitable solid-state strain gage arrangement is shown. Two cantilever arms 96 and 98 are affixed to a support member 100. A force input connector 102 is attached to the point 104 at which the arms 96 and 98 are joined. Four solid state strain gages 106, 108, 110 and 112 are affixed to arms 96 and 98. Each strain gage has two leads 114 which are connected in a bridge detection circuit in the manner disclosed in our co-pending application Serial No. 77,364.

The tapering of the arms 96 and 98 provides optimum utilization of the strain gages. The tapering of the arms produces a strain along the cantilever section that is uniform rather than increasing as the distance from point 104 increases. With this uniform strain, the entire strain gage length can be utilized without exceeding permissible strain levels in any portion of any of the four strain gages. The tapered strain gage supporting structure also has less mass at the end of the cantilever beam where the motion is greatest. This mass reduction at the point of maximum motion improves the dynamic response of the strain gage assembly.

Referring now to FIG. 18, a cross section view of an entire force-sensing transducer assembly is shown. The assembly consists of three major sub-sections. These are the temperature compensating assembly 120, the strain gage assembly 122 and the zero adjustment and acceleration compensation assembly 124. Connecting rod 102 couples all three assemblies together. Connecting link 126 provides a linkage from the transducer to the diaphragm 128. Thus, variations in the pressure on side 130 of diaphragm 128 will produce variations in the force applied to connecting link 126 and thus to the force sensing transducer assembly.

To accomplish zero adjustment, a spring 132 provides a biasing force to the transducer. The loading on the spring may be varied by screw 134 which passes through a section 140a of the base. The spring 132 fits into a recess 136 within arm 138. Connecting bar 102 is attached to the lateral adjusting plate 142 on arm 138. The plate 142 allows the transducer to be easily fabricated and yet have the points of connection of the connecting bar 102 to the compensating assembly, the strain gage assembly and the arm 138 all fall in one line.

When the force applied to arm 138 by spring 132 is varied the force applied to the strain gage assembly 122 at zero force input from connecting link 126 will vary. Thus, the spring 132 with its adjusting screw provides a single, reliable structure for achieving a variation in the zero signal from the transducer.

The arm 138 also has a small mass 146 attached to the arm by a screw 148 passing through slot 150 in mass 146. The mass 146 is on the other side of pivot point 152 from the point of attachment of connecting link 102. Pivot 152 is attached to section 140b of the base. For simplicity in the drawing, the interconnecting portions of the force-sensing transducer base 140 have been omitted. When the transducer is subject to acceleration, inertial forces are produced which tend to cause an output from the strain gage assembly. Inertial mass 146, however, also produces an input to the strain gage assembly under conditions of acceleration. Since the mass 146 is on the other side of the pivot 152, its inertial contribution is opposite in its effect from that produced by the remainder of the assembly. The distance of this mass from the pivot point affects the magnitude of the correction force achieved. Therefore, the adjustment of the mass 146 with respect to arm 138 provides a means for exactly balancing the compensation for inertial effects.

The strain gage assembly 122 attached to connecting rod 102 at point 104 has been rather completely described above. It consists of strain gages attached to the tapered arms 96 and 98 which are cantilevered from the bar 100 affixed to a portion 140c of the base by a screw 154. The temperature compensation mechanism attached to the connecting rod 102 at point 52 incorporates the features previously discussed in conjunction with FIG. 11. That is, the bi-metal strip assembly 50 varies the separation between the free ends of the arms 44 and 42 and thus varies the stiffness of this assembly with respect to axial motion of connecting bar 102.

This variation in stiffness means that the force which must be applied through connecting link 126 to produce a given output signal from the strain gage assembly varies accordingly. Thus, the temperature induced variation in stiffness compensates for the temperature induced variations in sensitivity of the strain gage assembly. The stiffness compensation assembly also incorporates the range shifting member 80. As discussed above, this member varies the compensation which would otherwise be applied in certain temperature ranges.

The U-shaped assembly is mounted at the base of the U to an angle 156. This angle is fastened at its other end to a portion 140d of the base of the transducer by a screw 158. An adjusting screw 160 is threaded through another portion 140e of the transducer base. Moving this screw in a direction which increases the distance that the screw protrudes from the section of base 140e will tend to spring the support angle 156 in a direction to distort the connecting point 52 upward with respect to the other ends of elongated elements 42 and 44. Thus, as the bi-metal U closes with increases in temperature, the point 52 will tend to be moved in an upward direction and thus produce an effect upon the strain gage assembly which is in the same direction as an increase in the pressure upon side 130 of diaphragm 128. That is, moving adjusting screw 160 further in will cause the output signal to increase with increases in temperature. Thus, this adjustment can compensate for temperature induced variation in the zero signal output.

Figure 19:
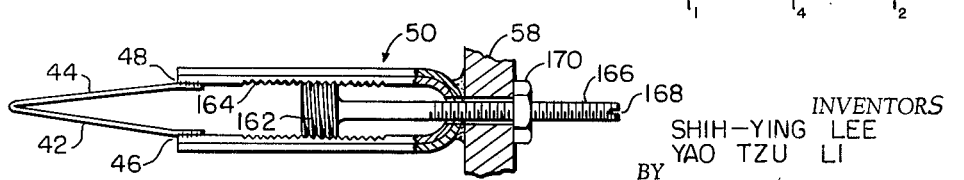
FIG. 19 is an elevation view, partly in cross-section, of another stiffness compensator incorporating variable temperature correction.

For certain applications the location of the screw 68, which is utilized to adjust the degree of compensation introduced by the stiffness compensation assembly 120, may be inconvenient for adjustment after assembly. For such applications we have developed another assembly which permits the adjustment to be made from a different direction. This stiffness compensation mechanism is shown in FIG. 19. For simplicity in the drawing, the other transducer elements have been omitted. The temperature compensated stiffness action is basically similar to that provided by the structure of FIGS. 8 and 9. That is, the independent ends of arms 44 and 42 have their separations varied by a bi-metal assembly 50.

In the structure of FIG. 8, the amount by which the separation of junction points 46 and 48 varies with temperature is determined by the position of a spacer 64 which is locked in place with the nut 66 and screw 68. In the structure of FIG. 19, the effective length of the bi-metal U arms is determined by the location of a threaded section 162. This section fits into threads 164 which are formed in the inner surface of the bi-metal U 50. A threaded shank 166 passes through a hole in the base 58. A slot 168 formed in the threaded shank 166 permits the threaded section 162 to be moved toward or away from the base 58. A nut 170 serves to lock the shank 166 in position once final adjustment has been made.

It might appear that the structure of FIG. 19 was subject to a disadvantage in that the threaded portion 162 would not restrain the bi-metal U from opening further. That is, it would change the effective length of the bi-metal arms only until the opening between the arms of the U 50 equalled the diameter of the threaded section 162. Further increases in opening would then be made by the entire bi-metal U, and in most applications it is desirable to change the length of the arms over the entire temperature range. We have found, however, that if the nut 170 is tightened so that the bi-metal 50 is sprung slightly, and force is applied to the threaded portions 164, the effective length of the bi-metal arms will be modified over the entire operating range. Under these conditions the resulting operation with the structure of FIG. 19 is that previously described in conjunction with FIG. 10 for the structures of FIGS. 8 and 9. Which structure should be employed depends primarily upon which entrance angle is most convenient to the transducer assembly in the particular application.

While elongated bar-like structures joined at one end have been used in the preferred embodiments described above, the separation of the independent ends being varied, other geometric configurations are suitable for use with our invention. For example, in FIG. 20, a truss-like structure is set forth. Two sections 172 and 174 are supported at points 176 and 178. The nature of the particular members 172 and 174 is relatively unimportant except for the consideration that at least one of these members must have an elastic response to applied loading. The central separation of the members 172 and 174 is varied as a function of temperature. The strength of the truss is a function of the separation of the members 172 and 174 and thus the stiffness compensation applied through a member connected to the central region of the truss will vary with changes in temperature.

A preferred method of achieving this stiffness variation in the structure of FIG. 20 is through the use of a connecting rod 180 and cylindrical section 182. The section 182 is rigidly attached to the truss member 174 at a central location 184. It is also rigidly attached to the connecting rod 180 at point 186. The connecting rod 180 passes freely through truss member 174 and is adjustably attached to member 172 at point 188. Nuts 190 and 192 on threaded section 194 permit this adjustment to be made.

For applications where more perfect compensation is required, curvature correction and modifications can be supplied in a manner analogous to that employed with the preferred two arm embodiment described above. For example, a member such as the member 80 shown in FIG. 12 can be applied between the central portions 184 and 188 of the truss. Such a member will, as before, serve to restrain increases in separation beyond some predetermined value and thus effect the stiffness correction applied with changes of temperature in that region. Similarly, while a symmetrical truss arrangement is shown, it can be distorted within initial bias in one direction or the other so that temperature induced variations in the separation of the two elements will produce an axial movement of rod 180.

FIG. 21 illustrates another embodiment which utilizes a beam-like structure. A beam 196 has a connecting rod 198 affixed to a point 200 near one end of the beam. An offset section 202 is provided at the other end of the beam. An elongated flexure element 204 is connected between the straight section 206 of beam 196 and a section 208a of the base. For clarity in the drawing, the various interconnecting portions of the base 208 are not shown. Since the element 204 is connected at point 210 in line with the straight section 206 of beam 196, the element 204 serves to provide an extension for beam 196. An additional flexure 212 is connected to point 214 at the end of offset section 202 of beam 196. This flexure 212 is arranged substantially perpendicular to flexure 204. A bi-metal assembly 216 has one end affixed to a section 208b of the base and the other end connected to the flexure section 212. The bi-metal element 216 is composed of two sections 218 and 220 with different thermal expansion characteristics. The beam 196 is also provided with a spring 222 which bears against point 224 on the beam. The other end of the spring 222 is affixed to section 208c of the base.

The operation of FIG. 21 is as follows. The connecting rod 198 is connected to a transducer assembly such as that described above in conjunction with the other embodiments. Thus, the connecting rod 198 is analogous to the connecting rod 102 in earlier structures. The desired overall characteristic is a restraint at point 200 which varies as a function of the temperature. We have found that one way to achieve this variation in the elastic restraint is to provide a variation in the relationship between motion of point 200 on connecting rod 198 and point 224 at the end of spring 222. The correct magnitude of elastic restraint is provided by the initial choice of spring constant for spring 222. Variations in the effect of spring 222 with temperature are achieved by varying the effective leverage between point 200 and the spring 222.

This variation in leverage is achieved as follows. When the temperature changes the end 226 of bi-metal assembly 216 will move as indicated by the dotted section. When the end 226 of bi-metal assembly 216 moves, it moves the flexure member 212. The effective pivot point of beam 196 is the intersection of flexure members 212 and 204. Thus, when the end 226 of bi-metal assembly 216 moves toward the base section 208a due to a change in temperature, the effective length of the beam 196 is increased. This increase in the length of the beam 196 means that the spring 222 is enabled to offer a greater resistance to the motion of point 200 where the connecting rod 198 is connected to the beam. Conversely, motion of point 226 away from the base section 208a means that the effective leverage available to the connecting rod is increased, so that the restraint of spring 222 to motion of the connecting rod 198 is decreased.

When the materials of which bi-metal assembly 216 is composed are chosen so that increases in temperature increase the leverage of connecting rod 198, the structure of FIG. 21 is suitable for incorporation into a transducer assembly which will compensate for decreases in strain gage sensitivity with increases in temperature. By varying the spring constant of spring 222, the characteristics of bi-metal assembly 216 and the initial spacing of the various elements, a considerable variation in compensation characteristics can be achieved to meet specific applications.

Thus, it will be seen that we have provided an improved force sensing transducer wherein simple, easily fabricated mechanical components can provide a fully corrected force sensing transducer. Those skilled in the measurement arts will recognize that various modifications can be made in the preferred embodiment shown and described without departing from the scope of our invention. For example, wire wound rather than solid state strain gages or any other type of transducer may be employed and certain of the design features may be omitted without diminishing the value of the remaining corrective features. Similarly, other geometric configurations whose stiffness varies with variations in one of the configuration arrangement dimensions or other spacing may be employed.

Having thus described our invention, we claim:

1. In a force sensing transducer of a type having a sensitivity which varies with temperature, having a deflectable member to which the input to the transducer is coupled so that the transducer output varies as a function of the deflection of said deflectable member, temperature compensating means, means to couple said temperature compensating means to said deflectable member, said temperature compensating means comprising a plurality of elements arranged in a predetermined geometric configuration, at least one of said elements having elastic properties, the stiffness of said geometric configuration varying with changes in the spacing of elements of said configuration, whereby the rate of change of the force as a function of deflection varies with changes in said spacing, and means to change the spacing of said elements with changes in temperature, whereby said temperature compensating means has a stiffness which varies with temperature, thereby providing the transducer with a stiffness with respect to deflection of said deflectable member which varies as a function of temperature.

2. In a force sensing transducer of a type having a sensitivity which varies with temperature, having a deflectable member to which the input to the transducer is coupled so that the transducer output varies as a function of the deflection of said deflectable member, temperature compensating means, means to couple said temperature compensating means to said deflectable member, said temperature compensating means comprising a plurality of elements arranged in a predetermined geometric configuration, at least one of said elements having elastic properties, the stiffness of said geometric configuration varying with changes in the spacing of elements of said configuration, whereby the rate of change of the force as a function of deflection varies with changes in said spacing, means to change the spacing of said elements with changes in temperature, whereby said temperature compensating means has a stiffness which varies with temperature, thereby providing the transducer with a stiffness with respect to deflection of said deflectable member which varies as a function of temperature, and means to vary the rate at which the spacing of said elements varies with changes in temperature, whereby the rate at which the stiffness of said transducer varies as a function of temperature may be varied to match the variation of transducer sensitivity with temperature.

3. In a force sensing transducer of a type having a sensitivity which varies with temperature, having a deflectable member to which the input to the transducer is coupled so that the transducer output varies as a function of the deflection of said deflectable member, temperature compensating means, means to couple said temperature compensating means to said deflectable member, said temperature compensating means comprising a plurality of elements arranged in a predetermined geometric configuration, at least one of said elements having elastic properties, the stiffness of said geometric configuration varying with changes in the spacing of elements of said configuration, whereby the rate of change of the force as a function of deflection varies with changes in said spacing, means to change the spacing of said elements with changes in temperature, whereby said temperature compensating means has a stiffness which varies with temperature, thereby providing the transducer with a stiffness with respect to deflection of said deflectable member which varies as a function of temperature, and means to move said geometric configuration with respect to said coupling means, said movement producing a modification of said configuration whereby said modified geometric configuration will deflect said coupling means with changes in temperature, whereby the output of the transducer in the absence of a change in input signal can be maintained at a constant level in the presence of temperature variations.

4. In a force sensing transducer of a type having a sensitivity which varies with temperature, having a deflectable member to which the input to the transducer is coupled so that the transducer output varies as a function of the deflection of said deflectable member, temperature compensating means, means to couple said temperature compensating means to said deflectable member, said temperature compensating means comprising a plurality of elements arranged in a predetermined geometric configuration, at least one of said elements having elastic properties, the stiffness of said geometric configuration varying with changes in the spacing of elements of said configuration, whereby the rate of change of the force as a function of deflection varies with changes in said spacing, means to change the spacing of said elements with changes in temperature, whereby said temperature compensating means has a stiffness which varies with temperature, thereby providing the transducer with a stiffness with respect to deflection of said deflectable member which varies as a function of temperature, and means to change the rate of change of the spacing of said elements with changes in temperature, whereby the variation in sensitivity of the transducer with temperature may be compensated over extended temperature ranges.

5. In a force sensing transducer of a type having a sensitivity which varies with temperature, having a deflectable member to which the input to the transducer is coupled so that the transducer output varies as a function of the deflection of said deflectable member, temperature compensating means, said temperature compensating means comprising two elongated elements, at least one of said elongated elements having elastic properties, means to couple said temperature compensating means to said deflectable member, one end of each of said elongated elements being connected to said coupling means, the stiffness of said temperature compensating means varying with changes in the separation of the other ends of said elongated elements, whereby the rate of change of the force produced by deflection of said compensating means varies with changes in said spacing, and means to change the separation of said other element ends with changes in temperature, whereby said temperature compensating means has a stiffness which varies with temperature, thereby providing the transducer with a stiffness with respect to deflection of said deflectable member which varies as a function of temperature.

6. In a force sensing transducer of a type having a sensitivity which varies with temperature, having a deflectable member to which the input to the transducer is coupled so that the transducer output varies as a function of the deflection of said deflectable member, temperature compensating means, said temperature compensating means comprising two elongated elements, at least one of said elongated elements having elastic properties, means to couple said temperature compensating means to said deflectable member, one end of each of said elongated elements being connected to said coupling means, the stiffness of said temperature compensating means varying with changes in the separation of the other ends of said elongated elements, whereby the rate of change of the force produced by deflection of said compensating means varies with changes in said spacing, means to change the separation of said other element ends with changes in temperature, whereby said temperature compensating means has a stiffness which varies with temperature, thereby providing the transducer with a stiffness with respect to deflection of said deflectable member which varies as a function of temperature, and a third element, said third element serving to restrain changes in separation of said elongated members at a predetermined spacing, whereby the rate of change of stiffness of said temperature compensating means with changes in temperatures changes at said predetermined spacing.

7. In a force sensing transducer of a type having a sensitivity which varies with temperature, having a deflectable member to which the input to the transducer is coupled so that the transducer output varies as a function of the deflection of said deflectable member, temperature compensating means, said temperature compensating means comprising two elongated elements, at least one of said elongated elements having elastic properties, means to couple said temperature compensating means to said deflectable member, one end of each of said elongated elements being connected to said coupling means, the stiffness of said temperature compensating means varying with changes in the separation of the other ends of said elongated elements, whereby the rate of change of the force produced by deflection of said compensating means varies with changes in said spacing, means to change the separation of said other element ends with changes in temperature, whereby said temperature compensating means has a stiffness which varies with temperature, thereby providing the transducer with a stiffness with respect to deflection of said deflectable member which varies as a function of temperature, and means to vary the rate at which the separation of said elements ends varies with temperature, whereby the rate at which the stiffness of said transducer varies as a function of temperature may be varied to match the variation of transducer sensitivity with temperature.

8. In a force sensing transducer of a type having a sensitivity which varies with temperature, having a deflectable member to which the input to the transducer is coupled so that the transducer output varies as a function of the deflection of said deflectable member, temperature compensating means, said temperature compensating means comprising two elongated elements, at least one of said elongated elements having elastic properties, means to couple said temperature compensating means to said deflectable member, one end of each of said elongated elements being connected to said coupling means, the stiffness of said temperature compensating means varying with changes in the separation of the other ends of said elongated elements, whereby the rate of change of the force produced by deflection of said compensating means varies with changes in said spacing, a temperature responsive adjusting assembly having two legs, the separation of said legs varying with changes in temperature so that the separation of said other element ends varies with changes in temperature, whereby said temperature compensating means has a stiffness which varies with temperature, thereby providing the transducer with a stiffness with respect to deflection of said deflectable member which varies as a function of temperature.

9. In a force sensing transducer of a type having a sensitivity which varies with temperature, having a deflectable member to which the input to the transducer is coupled so that the transducer output varies as a function of the deflection of said deflectable member, temperature compensating means, said temperature compensating means comprising two elongated elements, means to couple said temperature compensating means to said deflectable member, one end of each of said elongated elements being connected to said coupling means, the stiffness of said temperature compensating means varying with changes in the separation of the other ends of said elongated elements, whereby the rate of change of the force produced by deflection of said compensating means varies with changes in said spacing, means to change the separation of said other element ends with changes in temperature, whereby said temperature compensating means has a stiffness which varies with temperature, thereby providing the transducer with a stiffness with respect to deflection of said deflectable member which varies as a function of temperature, and means to move said separated ends with respect to said coupling means, said movement causing said elongated elements to deflect said coupling means with changes in temperature, whereby the output of the transducer in the absence of a change in input signal can be maintained at a constant level in the presence of temperature variations.

10. In a force sensing transducer of a type having a sensitivity which varies with temperature, having a deflectable member to which the input to the transducer is coupled so that the transducer output varies as a function of the deflection of said deflectable member, temperature compensating means, said temperature compensating means comprising two elongated elements, at least one of said elongated elements having elastic properties, means to couple said temperature compensating means to said deflectable member, one end of each of said elongated elements being connected to said coupling means, the stiffness of said temperature compensating means varying with changes in the separation of the other ends of said elongated elements, whereby the rate of change of the force produced by deflection of said compensating means varies with changes in said separation spacing, and a bi-metallic element, said bi-metallic element being connected to the said other ends of said elongated elements, the bi-metallic element serving to change the separation of said other element ends with changes in temperature, whereby said temperature compensating means has a stiffness which varies with temperature, thereby providing the transducer with a stiffness with respect to deflection of said deflectable member which varies as a function of temperature.

11. In a force sensing transducer of a type having a sensitivity which varies with temperature, having a deflectable member to which the input to the transducer is coupled so that the transducer output varies as a function of the deflection of said deflectable member, temperature compensating means, said temperature compensating means comprising at least two elements connected in a truss configuration, at least one of said elements having elastic properties, said truss having ends and a central portion, means to couple said temperature compensating means to said deflectable member, said coupling means being connected to the central portion of said truss configuration, the stiffness of said temperature compensating means varying with changes in the separation of the elements in the central portion of said truss, whereby the rate of change of the force produced by deflection of said compensating means varies with changes in said separation spacing, and means to change the separation of elements in the central portion of said truss with changes in temperature, whereby said temperature compensating means has a stiffness which varies with temperature, thereby providing the transducer with a stiffness with respect to deflection of said deflectable member which varies as a function of temperature.

12. In a force sensing transducer of a type having a sensitivity which varies with temperature, having a deflectable member to which the input to the transducer is coupled so that the transducer output varies as a function of the deflection of said deflectable member, temperature compensating means, said temperature compensating means comprising a beam element, said beam having a pivot portion, means to couple said beam to said deflectable member, a resilient member intermediate said pivot portion and said coupling means, said resilient member engaging said beam member, the resistance afforded by said beam to movements of said coupling member varying with changes in the location of the point at which said resilient member engaged said beam, whereby the rate of change of the force produced by deflection of said compensation means varies with changes in said location, and means to change the location of the point at which said resilient member engages said beam with changes in temperature, whereby said temperature compensating means has a stiffness which varies with temperature, thereby providing the transducer with a stiffness with respect to deflection of said deflectable member which varies as a function of temperature.

References Cited by the Examiner

UNITED STATES PATENTS

| | | | |
|---|---|---|---|
| 1,393,828 | 10/21 | Reichmann | 177—226 X |
| 2,357,356 | 9/44 | Petty | 73—382 |
| 2,584,950 | 2/52 | Weckerly | 177—226 X |
| 3,034,345 | 5/62 | Mason | 73—141 |

RICHARD C. QUIESSER, *Primary Examiner.*

UNITED STATES PATENT OFFICE
CERTIFICATE OF CORRECTION

Patent No. 3,199,345                                        August 10, 1965

Shih-Ying Lee et al.

It is hereby certified that error appears in the above numbered patent requiring correction and that the said Letters Patent should read as corrected below.

Column 1, line 47, for "bride" read -- bridge --; column 5, lines 42 and 43, after "mechanism" insert -- corresponding to the stiffness compensation mechanism --; column 9, line 21, after "and" insert -- other --.

Signed and sealed this 8th day of March 1966.

(SEAL)
Attest:

ERNEST W. SWIDER                                       EDWARD J. BRENNER
Attesting Officer                                           Commissioner of Patents